US011110611B2

(12) United States Patent
Häusler (10) Patent No.: US 11,110,611 B2
(45) Date of Patent: Sep. 7, 2021

(54) AUTOMATIC DETECTION AND ROBOT-ASSISTED MACHINING OF SURFACE DEFECTS (71) Applicant: Atensor Engineering And Technology Systems GmbH, Steyr (AT)

(72) Inventor: Kurt Häusler, Steyr (AT)

(73) Assignee: Atensor Engineering And Technology Systems GmbH, Steyr (AT)

(*) Notice: Subject to any disclaimer, the term of this patent is extended or adjusted under 35 U.S.C. 154(b) by 136 days.

(21) Appl. No.: 15/974,482

(22) Filed: May 8, 2018

(65) Prior Publication Data
US 2018/0326591 A1   Nov. 15, 2018

Related U.S. Application Data (63) Continuation-in-part of application No. PCT/EP2016/077017, filed on Nov. 8, 2016.

(30) Foreign Application Priority Data

Nov. 9, 2015   (DE) .................. 10 2015 119 240.3

(51) Int. Cl.
*G06K 9/03* (2006.01)
*G01B 11/25* (2006.01)
(Continued)

(52) U.S. Cl.
CPC ........... *B25J 11/0065* (2013.01); *B24B 51/00* (2013.01); *B25J 9/1664* (2013.01); *B25J 9/1697* (2013.01);
(Continued)

(58) Field of Classification Search
CPC ...... G05B 19/4097; G05B 2219/45058; G05B 2219/35012; B05D 5/005; B24B 51/00;
(Continued)

(56) References Cited

U.S. PATENT DOCUMENTS 6,292,715 B1   9/2001   Rongo
6,320,654 B1   11/2001   Alders et al.
(Continued)

FOREIGN PATENT DOCUMENTS

CN   101634544   1/2010
CN   101762241   6/2010
(Continued)

OTHER PUBLICATIONS

Patent Cooperation Treaty, "International Search Report," and English translation of international search, issued in International Patent Application No. PCT/EP2016/077017, dated Jun. 13, 2017, document of 6 pages.
(Continued)

*Primary Examiner* — Michael J Brown
(74) *Attorney, Agent, or Firm* — Akerman LLP; Peter A. Chiabotti (57) ABSTRACT A method for automated detection of defects in a workpiece surface and generation of a robot program for the machining of the workpiece is described. In accordance with one embodiment, the method comprises the localization of defects in a surface of a workpiece as well as determining a three-dimensional topography of the localized defects and categorizing at least one localized defect based on its topography. Dependent on the defect category of the at least one defect, a machining process is selected and, in accordance with the selected machining process, a robot program for the robot-assisted machining of the at least one defect is generated with the assistance of a computer.

17 Claims, 6 Drawing Sheets (51) Int. Cl.
  *G01B 11/24* (2006.01)
  *G01N 21/95* (2006.01)
  *B25J 11/00* (2006.01)
  *G05B 19/4097* (2006.01)
  *G01N 21/88* (2006.01)
  *B24B 51/00* (2006.01)
  *B62D 65/00* (2006.01)
  *B25J 9/16* (2006.01)
  *G05B 19/40* (2006.01)
  *G06K 9/00* (2006.01)
  *B05D 5/00* (2006.01)
  *G01C 11/00* (2006.01)

(52) U.S. Cl.
  CPC .............. *B62D 65/00* (2013.01); *G01B 11/24* (2013.01); *G01B 11/25* (2013.01); *G01N 21/8806* (2013.01); *G01N 21/95* (2013.01); *G05B 19/4097* (2013.01); *G06K 9/03* (2013.01); *B05D 5/005* (2013.01); *G01C 11/00* (2013.01); *G05B 2219/35012* (2013.01); *G05B 2219/45058* (2013.01); *G06K 9/00201* (2013.01)

(58) Field of Classification Search
  CPC ...... G01B 11/24; G01B 11/25; B25J 11/0065; B25J 9/1664; B25J 9/1697; G06K 9/03; G06K 9/00201; G01N 21/95; G01N 21/8806; B62D 65/00; G01C 11/00
  USPC ............................................ 700/98, 110, 259
  See application file for complete search history.

(56) References Cited

U.S. PATENT DOCUMENTS

| | | | |
|---|---|---|---|
| 6,714,831 B2 | 3/2004 | Matthews et al. | |
| 9,595,091 B2* | 3/2017 | Kaizerman | ............ G06T 7/0004 |
| 2002/0109110 A1* | 8/2002 | Some | ................. G01N 21/9501 |
| | | | 250/559.4 |
| 2003/0139836 A1* | 7/2003 | Matthews | ............... B05D 5/005 |
| | | | 700/110 |
| 2003/0171841 A1 | 11/2003 | Porter et al. | |
| 2006/0226865 A1* | 10/2006 | Gallarda | ........... G02F 1/136259 |
| | | | 349/192 |
| 2012/0330447 A1* | 12/2012 | Gerlach | ................. G01B 21/20 |
| | | | 700/95 |
| 2014/0046471 A1* | 2/2014 | Bamford | .............. G05B 19/048 |
| | | | 700/110 |

FOREIGN PATENT DOCUMENTS

| | | |
|---|---|---|
| CN | 104858748 | 8/2015 |
| DE | 197 30 885 | 1/1999 |
| DE | 60132706 | 2/2009 |
| WO | 87/00629 | 1/1987 |
| WO | 2012067648 | 5/2012 |

OTHER PUBLICATIONS

Xu et al., "Automatic tool path generation from structuralized machining process integrated with CAD/CAPP/CAM system," Int J Adv Manuf Technol (2015), 80:1097-1111, document of 16 pages, DOI I0.1007/s00170-015-7067-5.

World Intellectual Property Organization, "International Preliminary Report on Patentability," and English translation thereof issued in International Application No. PCT/EP2016/077017, on May 15, 2018, document of 32 pages.

Vectric Ltd, "2.5D Texturing Toolpaths", (Aug. 13, 2012), URL: https://www.youtube.com/watch?v=EEdH48ex9CI, (May 3, 2017), XP054977299 [AO] 1-17 * the whole document *.

Valerie Bolhouse, "Automated Find Fix & Eliminate for Automotive Paint Systems", (Feb. 6, 2011), URL: https://web. archive.org/web/20110206084812//p://www.asimo.pl/materialy/download/find fix eliminate.pdf, (Apr. 25, 2017), XP055367354 [A] 1-17 * p. 9-p. 10 *.

Matthew Berger et al., "State of the Art in Surface Reconstruction from Point Clouds", Eurographics star report, doi:10.2312/egst.20141040> , (Apr. 1, 2014), pp. 161-185, URL: https://hal.inria.fr/docs/01/01/77/00/PDF/star_author.pdf, (Apr. 26, 2017), XP055367964 [A] 4,16 * paragraph [0001] *.

Mark Albert, "Feature Recognition—The Missing Link To Automated CAM : Modern Machine Shop", (Apr. 15, 2001), URL http://www.mmsonline.com/articles/feature-recognition-the-missing-link-to-automated-cam, (Apr. 24, 2017), XP055366929 [A] 1-17 * the whole document *.

Chinese Patent Office, "First Office Action," and English translation thereof, issued in Chinese patent application No. 201680078039 dated Jun. 23, 2020, document of 16 pages.

Chinese Patent Office, "Second Office Action," and English translation thereof, issued in Chinese patent application io. 201680078039 dated Mar. 10, 2021, document of 16 pages.

Tam et al., "Robotic polishing of free-form surfaces using scanning paths," pp. 191-200, Journal of Materials Processing Technology, vol. 95, Issue 1-3, Oct. 15, 1999.

* cited by examiner

AUTOMATIC DETECTION AND ROBOT-ASSISTED MACHINING OF SURFACE DEFECTS

CROSS REFERENCE TO RELATED APPLICATIONS

This application is a Continuation-In-Part Application and claims the benefit of PCT/EP2016/077017 designating the United States, filed Nov. 8, 2016, the entirety of which is herein incorporated by reference and which claims priority to German Patent Application No. DE 10 2015 119 240.3, filed Nov. 9, 2015.

TECHNICAL FIELD

The present disclosure generally relates to the field of industrial robots, in particular to a system and a method for the automated detection of defects in surfaces (e.g. painting defects on a car body) and the robot-assisted machining thereof, in particular by grinding and polishing.

BACKGROUND

In automated robot-assisted manufacturing, for example in the automotive sector, the problem arises, inter alia, of automatedly detecting defects in surfaces of a workpiece (for example defects in the paint layer after the painting of the workpiece) and, if necessary, to repair them by means of robots (e.g. by gridding or polishing). Systems and methods for robot-assisted detection of surface defects have been known for some time. For example, an inspection apparatus movably arranged on a robot arm with an illumination unit and a camera unit is known from publication WO 87/00629 A1. The camera unit receives the light of the illumination unit reflected from the surface to be inspected and, in doing so, identifies surface defects. A method for detecting surface defects in bodies-in-white in a portal unit with a conveyor is known from DE 197 30 885 A1, wherein detected surface defects are marked in a successive marking apparatus. For this purpose controllably movable and triggerable marking nozzles are installed on a portal, which are equipped with water-soluble paint for the marking of relevant surface defects. A distance adjustment regulated according to the contour is provided for the marking nozzles.

Most of the systems employed today are limited to detecting and marking surface defects. Frequently the defects are then individually checked and repaired manually by a skilled worker. A system for detecting and repairing defects, particularly on painted surfaces, is known from the publication U.S. Pat. No. 6,714,831 B2, wherein the positions of the surface defects are determined in the coordinate system of the inspected object, a repair strategy is developed, and, based on this repair strategy, a repair system is controlled using the object coordinates of the positions of the defects. The "repair strategy" thereby includes the selection of the path along which the defects are approached, as well as the selection of the tools and the robots. However, as not all surface defects can be machined in the same manner, and some defects need not be machined at all, there is a need for improvement.

The application discloses a method and a system which is capable of automatedly detecting surface defects and to repairing them with the help of robots. In doing so, the machining of the surface defects as part of the robot-assisted repair should be adapted to the type (the characteristics) of the defect.

SUMMARY

Some exemplary embodiments are summarized below. Various other embodiments and further developments are discussed further below in the Detailed Description.

In the following a method for the automated detection and robot-assisted machining of defects in a workpiece surface is described. In accordance with one embodiment, the method includes an optical inspection of the surface to detect defects as well as a three dimensional measurement of the workpiece surface in the area of detected defects by means of optical sensors. The method further includes the determination of the topography of the workpiece surface in the area of at least one defect and the determination of a parameter set that characterizes the at least one defect. At least one of the defects is categorized based on the determined parameter set. That is, the defect is assigned to a defect category. Dependent on the defect category of the at least one defect a machining process is selected. When doing so, each machining process is associated with at least one template of a machining path along which the defect is to be machined. At least one machining path is determined for the at least one defect by means of projection of the at least one template onto the workpiece surface in accordance with a CAD model of the workpiece. Subsequently, the computer-assisted generation of a robot program for the robot-assisted machining of the at least one defect can be carried out.

Furthermore, a method for automated detection of defects in a workpiece surface and for the generation of a robot program for the machining of the workpiece is described. In accordance with one further embodiment, the method comprises the localization of defects in a surface of a workpiece as well as determining a three-dimensional topography of the localized defects and categorizing at least one localized defect based on its topography. Dependent on the defect category of the at least one defect, a machining process is selected and, in accordance with the selected machining process, a robot program for the robot-assisted machining of the at least one defect is generated with computer assistance.

In one embodiment, a parameter set may be determined which characterizes the topography of the localized defects. The categorization of the at least one localized defect is carried out based on the determined parameter set, wherein the defect may be unambiguously assigned to a defect category. The determination of the three-dimensional topography of the localized defects includes, for example, the determination of 3D-coordinates of a point cloud as well as a three-dimensional reconstruction of the workpiece surface in the area of the respective defect.

Each machining process may be associated with at least one template of a machining path along which the defect is to be machined. A machining path for the at least one defect may then be determined by means of projection of the at least one template onto the workpiece surface in accordance with a CAD model of the workpiece.

Moreover a system for automated detection and robot-assisted machining of defects in a workpiece surface is described. In accordance with one embodiment, the system includes an optical inspection and measurement system for the inspection of the surface, both for defecting defects as well as for the three-dimensional measurement of the workpiece surface in the area of detected defects with the use of optical sensors. The system further comprises at least one industrial robot for machining the workpiece surface, as well as a data processing device that is configured to determine the topography of the workpiece surface in the area of at least one defect, as well as a parameter set that characterizes the at least one defect. The at least one defect is categorized based on the determined parameter set. That is, the defect is assigned to a defect category. A machining process stored in a database is selected in dependency of the defect category of the at least one defect. Each machining process is associated with at least one template of a machining path along which the defect is to be machined. A specific machining path for the at least one defect is subsequently determined by means of projection of the at least one template onto the workpiece surface in accordance with a CAD model of the workpiece. Subsequently, a robot program for the robot-assisted machining of the at least one defect by at least one industrial robot may be generated.

Furthermore, a system for the automated detection of defects in a workpiece surface and generation of a robot program for the machining of the workpiece is described. In accordance with one embodiment, the system includes an optical inspection system for the localization of defects in a surface of a workpiece, as well as a data processing device configured to determine a three-dimensional topography of the localized defects, assign at least one localized defect to a defect category based on its topography and select a machining process dependent on the defect category of the at least one defect. Subsequently, a robot program for the robot-assisted machining of the at least one defect may be generated in accordance with the selected machining process

BRIEF DESCRIPTION OF THE DRAWINGS

In the following, various embodiments will be described in detail by means of the examples shown in the figures. The illustrations are not necessarily true to scale and the embodiments are not limited to only the illustrated aspects. Instead, importance is given to illustrating the principles underlying the embodiments. In the figures.

DETAILED DESCRIPTION

The following description relates basically to the detection of surface defects in painted workpiece surfaces. The application of the method described herein is, however, not limited to the inspection of painting processes, but may also be used for the detection and machining (with regard to a repair, spot-repair) of surface defects resulting from causes different from an imperfect painting.

During a painting process, various surface defects such as dirt or fiber inclusions, PVC remnants or "craters" may occur after each painting step. Today, in many production plants defects of that kind are detected by qualified personnel and repaired by manual grinding. Despite the fact that, today, in the field of painting the majority of activities are automated, the correction of any defects is a very personnel and time consuming activity, the result of which heavily depends on the person carrying it out. Due to the subjective assessment of the responsible person who evaluates whether and, as the case may be, how a paint defect is to be eliminated in accordance with applicable quality standards, maintaining a uniform quality proves to be difficult.

The methods described herein are intended to allow for a full automation of the surface inspection, of the evaluation of the detected surface defects and of their machining. The automated, computer-assisted evaluation of the measurement results would allow reproducible quality, and the specifiable quality standards can be constantly complied with.

Figure 1:
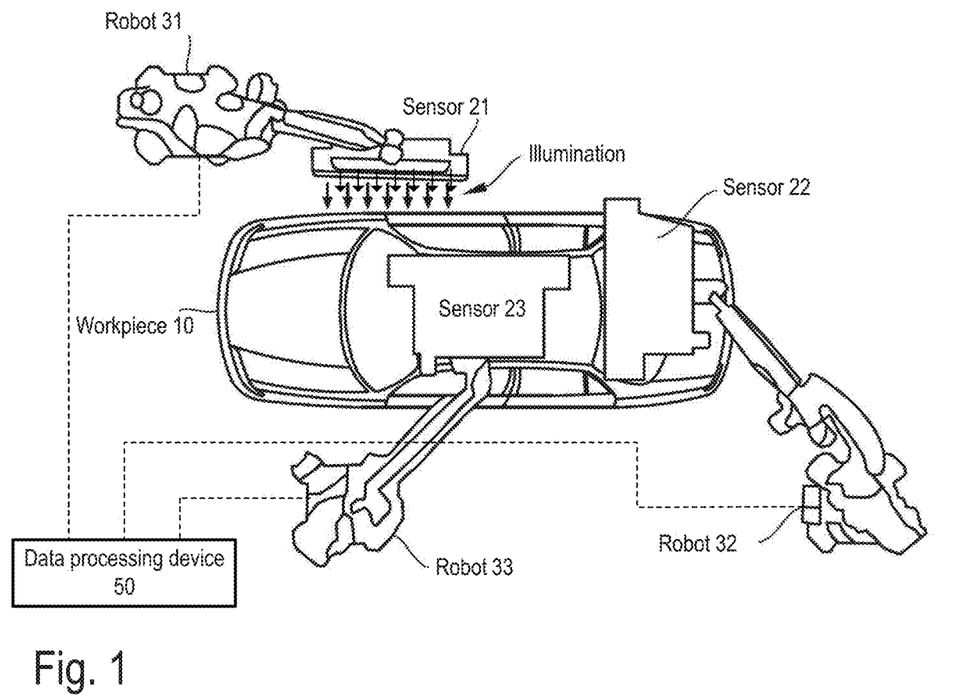
FIG. 1 shows an arrangement for optical inspection of a workpiece surface (car body) by means of optical sensors arranged on manipulators.

Various measurement systems for the three-dimensional measurement of workpiece surfaces are known. In the examples described herein, the measurement system (optical inspection system) operates based on the technique of deflectometry which allows to detect and localize defects starting from a lateral (i.e. along the surface) extent of about 100 µm on painted surfaces. FIG. 1 shows an example of a measurement system with a plurality of sensors, guided by manipulators (industrial robots), for the optical inspection, with the use of cameras, of the surface of a workpiece 10, for example, a car body painted with base coat and primer. The purpose of the surface inspection is a detection (this includes a localization) of surface defects and a three-dimensional measurement of at least those areas of the workpiece surface in or on which a defect has been detected. In the present example, manipulators 31, 32, and 33, equipped with sensor heads 21, 22, and 23, are employed in a robot cell and perform the surface inspection simultaneously. Dependent on the time available for the surface inspection, two or more manipulators may be employed. In specific applications, a single robot with a sensor head may be sufficient.

In the present example, each of the sensor heads includes an LCD monitor (for illumination), a plurality of (e.g. four) cameras, and a controller unit. With the use of the LCD monitor structured light may be generated for the illumination of the workpiece surface, which is imaged by high-resolution cameras. The structured light generated by the LCD monitor has a stripe pattern with a sinusoidal brightness modulation which is projected onto the workpiece. The resulting reflected pattern is captured—for different phase shifts of the stripe pattern—by the cameras of the respective sensor heads 21, 22, and 23, and the captured images are evaluated to determine the coordinates of surface defects ("defect candidates", to be precise) on the surface of the workpiece. When using the measurement system described herein, a three-dimensional measurement of the whole workpiece surface is not needed for the determination of defect candidates. The defect candidates may have already been localized in a two-dimensional camera image (with the mentioned stripe pattern) using a CAD model of the workpiece. Subsequently, a three-dimensional measurement need only be done for those areas in which a defect candidate has been localized by use of a deflectometric measurement technique. Whether a defect candidate actually is a surface defect to be machined may then be evaluated based on the three-dimensional measurement. In the present example, no separate image acquisition is required for the three-dimensional measurement, but instead only a digital evaluation of the two-dimensional camera images (curvature images, the curvature information is in the gray values of the individual pixels); from these, point clouds of 3D coordinates of points on the surface of the workpiece (in the areas of defects/defect candidates) can be calculated.

Using a best fit approach characteristic features (e.g. edges, holes, corners, etc.) distributed throughout the workpiece surface are considered before each measurement with one of the sensor heads 21, 22, 23. From these, the exact position of the workpiece relative to a desired position (based on a CAD model of the workpiece) is determined. The manipulators 31, 32, and 33 may then be controlled such that the determined position deviations are compensated. In doing so, it is ensured that the positions of the sensor heads 21, 22, and 23 relative to the workpiece surface to be inspected are always the same for various workpieces of the same kind and independent of any position tolerances. This allows for a very precise localization of a defect on the CAD model of the workpiece. This accuracy of the positioning may also be important for the automated machining of the workpiece for repair of the surface defects as explained further below.

The first result of a three-dimensional measurement of a defect candidate is a point cloud that describes the three-dimensional structure (the topography) of the relevant surface area. For each defect candidate, for example, its lateral extension (across the surface) and its height or depth (extension perpendicular to the surface) can be determined with great precision from the point clouds provided by the sensor heads 21, 22, and 23 (see also FIG. 3) using surface reconstruction. When, as shown in the example of FIG. 1, the sensor heads for the optical inspection are moved by use of manipulators, the measurement values (point coordinates) determined by a sensor head must undergo a coordinate transformation into a global coordinate system. Naturally, this coordinate transformation depends on the position of the respective sensor head and thus on the joint angles of the manipulator that carries the sensor head. Accordingly, in the coordinates of a point cloud (of a surface defect or a defect candidate) the positions of the sensor heads 21, 22, and 23 during the measurements are taken into account. A suitable measurement system is, for example, the system reflectCONTROL of Micro-Epsilon Messtechnik. Dependent on the application, other systems may be used for the three-dimensional measurement of surfaces. As such measurement systems are well known, they will not be described in further detail here.

The system shown in FIG. 1 includes a data processing device 50 which, in one embodiment, is configured to (inter alia) localize defects and determine the mentioned three-dimensional topography of the localized defects (or defect candidates). Basically, the data processing device may be any entity including hardware, software or any combination thereof, which is capable of performing the automated processing of the data (i.e. the mentioned point clouds) provided by the measurement system (e.g. by the sensors 21, 22, and 23) in order to obtain machining paths and a corresponding robot program suitable for repairing the defects. For this purpose, the data processing device 50 may include one or more processors with a memory containing instructions that, when executed, cause the optical inspection system to perform the activities described herein. In one example, the data processing device 50 may include a workstation computer or a personal computer including interface modules (hardware and software) allowing communication with the optical inspection system, e.g. with the robots 31, 32, and 33, and the sensors 21, 22, and 23.

Figure 2:
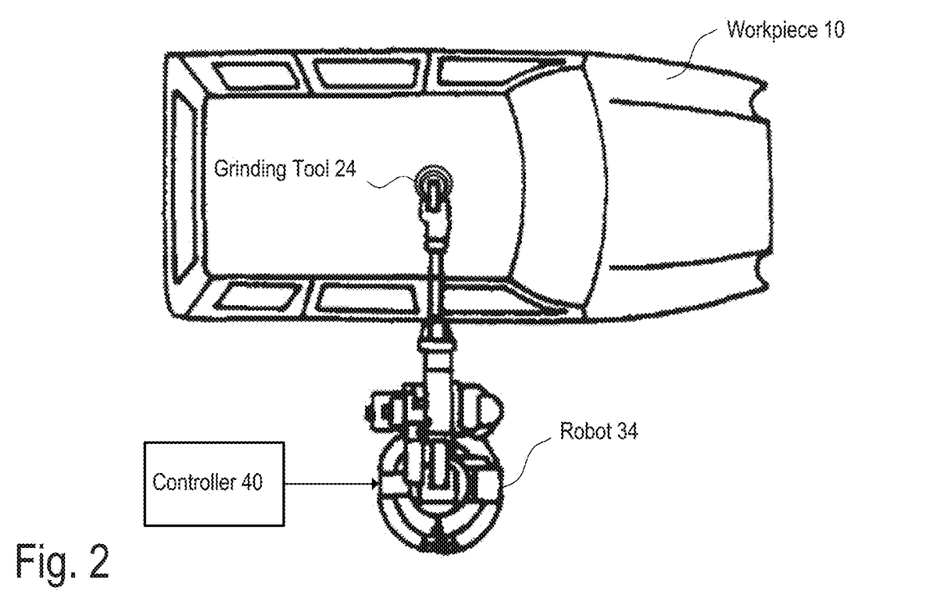
FIG. 2 shows a manipulator with a grinding tool for robot-assisted machining (in particular for the purpose of repair, spot-repair) of surface defects.

Before explaining the processing of the surface measurement data that is detected by the measurement system of FIG. 1 in greater detail, the robot-assisted repair of the detected surface flaws should be briefly discussed. FIG. 2 shows a robot cell with a manipulator 34 that is equipped with a grinding tool 24 (e.g. an orbital grinding machine). The manipulator 34 may here include a handling device (not shown, cf. actuator 25 in FIG. 10), which is arranged between the tool center point (TCP) of the manipulator 34 and the grinding tool 24 and which is configured to practically arbitrarily adjust (within certain limits) and, e.g., keep the contact force with which the grinding tool 24 is pressed against the surface of the workpiece 10 at a constant level or segment-wise at a constant level. The controller 40 does not only set the trajectory of the robot but also the tool-dependent parameters relevant to the repair process such as, e.g., contact pressure of the grinding tool 24, rotational speed or velocity of the abrasives and the like.

Figure 3:
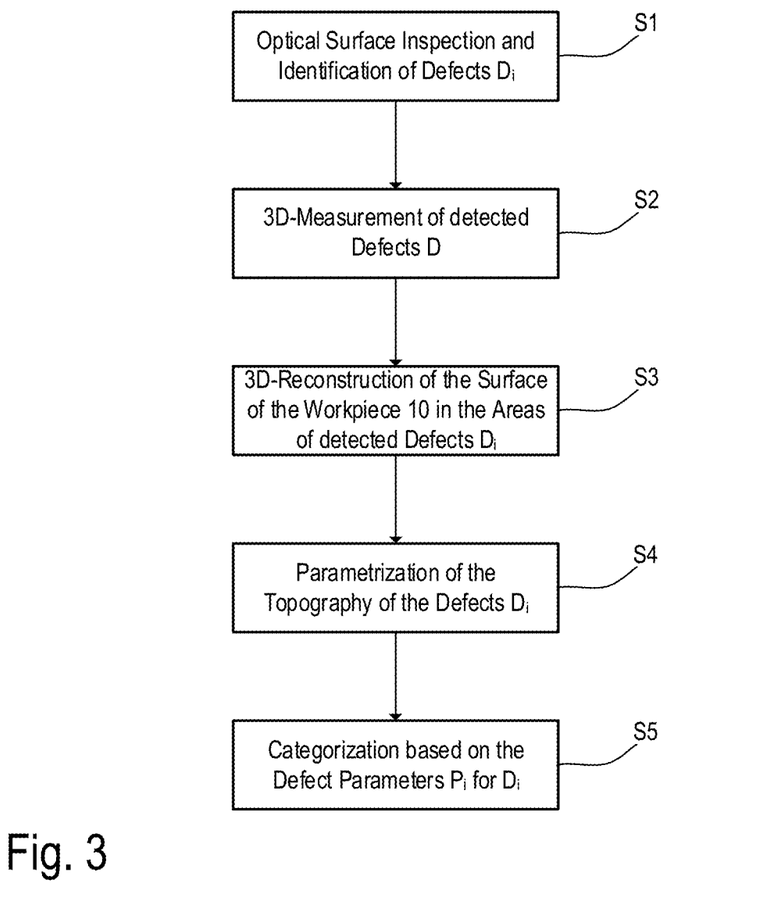
FIG. 3 shows, in a flow chart, one example of a method for the automated detection and classification of surface defects.

FIG. 3 illustrates, by means of a flow chart, one example of a method with which surface defects may automatedly be detected (identified as such and localized) and automatedly classified in accordance with specifiable criteria. The further machining of the surface for repairing (sport-repair) the defect depends on the classification of the defect (cf. the explanations concerning FIG. 4). In a first step, the automated surface inspection is performed (see FIG. 3, step S1) in order to detect potential surface defects (defect candidates) (e.g. by use of image processing techniques as such known) and to obtain, for each defect candidate and with use of 3D measurement of the workpiece surface, a point cloud (see FIG. 3, step S2), which represents the workpiece surface in the area of a surface defect. In this way a set D of N surface defects is determined ($D=\{D_1, D_2, \ldots, D_N\}$). A measurement system, that is suitable for this has already been discussed with reference to FIG. 1. In a further step, a surface reconstruction is carried out, i.e. a three-dimensional reconstruction of the workpiece surface (see FIG. 3, step S3) to determine the structure (topography) of the respective defect candidate.

When a defect $D_i$ is detected on the surface of a workpiece 10, it is parametrized in accordance with the method described herein (see FIG. 3, step S4). That is, a set $P_i$ of characteristic parameters which abstractly describe the topography of the defect $D_i$ is assigned to each defect $D_i$. In a simple case, the parameter set $P_i$ may include the lateral (along the workpiece surface) extension $d_i$ as well as the extension $t_i$ perpendicular to the workpiece surface ($P_i=\{d_i, t_i\}$). The lateral extension $d_i$ may designate, e.g., the length of a scratch or the diameter of an (approximately circular) bulge (e.g. due to a drop of paint) on the painted surface. The extension $t_i$ might designate the depth of a scratch or the height of a bulge (with reference to the ideal workpiece surface). A more complex parametrization is possible dependent on the application. In addition to the extension of a surface defect, the steepness of a defect may also be relevant to the subsequent machining. This may be, e.g., characterized by a parameter of the set $P_i$ and may be, for example, the ratio of the area of a surface defect with respect to its height or depth $t_i$ or the ratio $t_i/d_i$ or an average gradient (slope) of the surface structure in the area of the defect. Further, the position and the orientation of a defect $D_i$ are represented by a point $O_i$ on the surface of the workpiece and the respective normal vector $n_i$. The point $O_i$ may designate, e.g., approximately the "center" (e.g. the centroid) of a surface defect. The normal vector $n_i$ defines a plane $E_i$, which is also referred to as defect plane (see also FIGS. 4 and 6).

Dependent on the parameter set $P_i$ (i.e. dependent on the values of the parameters included in the parameter set $P_i$) the respective defect $D_i$ is assigned to a defect category $K_j$ from the set $K=\{K_1, K_2, \ldots, K_M\}$, wherein M denotes the number of defect categories. For each defect category $K_j$ a machining process $R_j$ for the robot-assisted machining of the surface defect is stored in a database (e.g. included in the memory of the data processing device 50 shown in FIG. 1). A machining process $R_j$ for the machining of a defect $D_i$ of a specific defect category $K_j$ is defined by a the tool to be used and the machining steps to be performed with the tool. A machining step is defined by one or more machining paths, which are defined by base points, a path velocity with which the machining paths are to be run through, as well as time and/or position-dependent trigger points on the machining paths at which specifiable actions may be triggered (e.g. change of process parameters such as, e.g., contact pressure, rotational speed, activation of a rotational and/or eccentric motion of the grinding tool and the like).

A, so to speak, evaluation of the surface defects with regard to various criteria is carried out with the categorization of the surface defects (defect candidates). In practice, relevant or useful criteria for the categorization of surface defects may be, e.g., the distinction of defects with regard to size categories (e.g. very small, small, medium, large), the distinction of defects with regard to their lateral extension (e.g. defined by the average or maximum radius of the defect), the distinction of flaws with regard to their extension perpendicular to the workpiece surface (e.g. an encapsulation (bulge) with a height of more than 5 μm, a crater (dent) with a depth of more than 10 μm, etc.).

Whether or not a detected surface defect (defect candidate) needs to be machined at all may also be made to depend on various criteria. Possible criteria for this are, e.g. the number of flaws of a specific category within a defined zone of the workpiece. For example, a single surface defect may be accepted, while, when a plurality of surface defects appear (or a specific number of surface defects), at least so many of these must be machined until the maximum allowable number is achieved. Similarly, a machining of surface defects may be made dependent on whether they appear cumulatively (i.e. when more than a specific number of defects appear within a spatially confined area of the workpiece surface). Seen individually, a very small defect would not be relevant. When, however, too many (not relevant if seen individually) very small defects are within a specific distance to each other, then these together are no longer irrelevant and have to be considered in the machining process. Based on these criteria, for example, some defect candidates may be removed from the list of defects to be machined. The method steps illustrated by in FIG. 3 may be performed at least partly by the data processing device 50 shown in FIG. 1. In particular, the data processing device 50 may be configured to assign the localized defects $D_1$, $D_2, \ldots, D_N$, based on their three-dimensional topography, to specific defect categories $K_1, K_2, \ldots, K_N$.

As mentioned above, each defect category $K_j$ is associated with exactly one machining process $R_j$ which may include one or more machining steps, wherein in each machining step the tool is moved, by use of a manipulator, along at least one machining path (see FIG. 2, tool 24, manipulator 34). These machining paths are stored (e.g. in the mentioned database) in the form of templates, which are defined in a plane (the defect plane) independently from the actual geometry of the workpiece. A template $X_i$ is composed of a plurality of points $X_{i1}$, $X_{i2}$, etc. which—in order to obtain the actual machining path $X_i'$ from the template $X_i$—are projected from the defect plane $E_i$ onto the workpiece surface (in accordance with the CAD model). The projected points $X_{i1}'$, $X_{i2}'$, etc. form the actual machining path $X_i'$ for a specific machining step of a machining process $R_j$ for the machining of a defect $D_i$ of category $K_j$. A normal vector $n_{i1}'$, $n_{i2}'$, etc. is associated with each point $X_{i1}'$, $X_{i2}'$, etc. Between two projected points the path may be completed, e.g. by use of spline interpolation. This approach is outlined in FIG. 4. During the machining, the machining tool is always pressed onto the workpiece 10 perpendicular to the workpiece surface with a defined, adjustable force.

Figure 5:
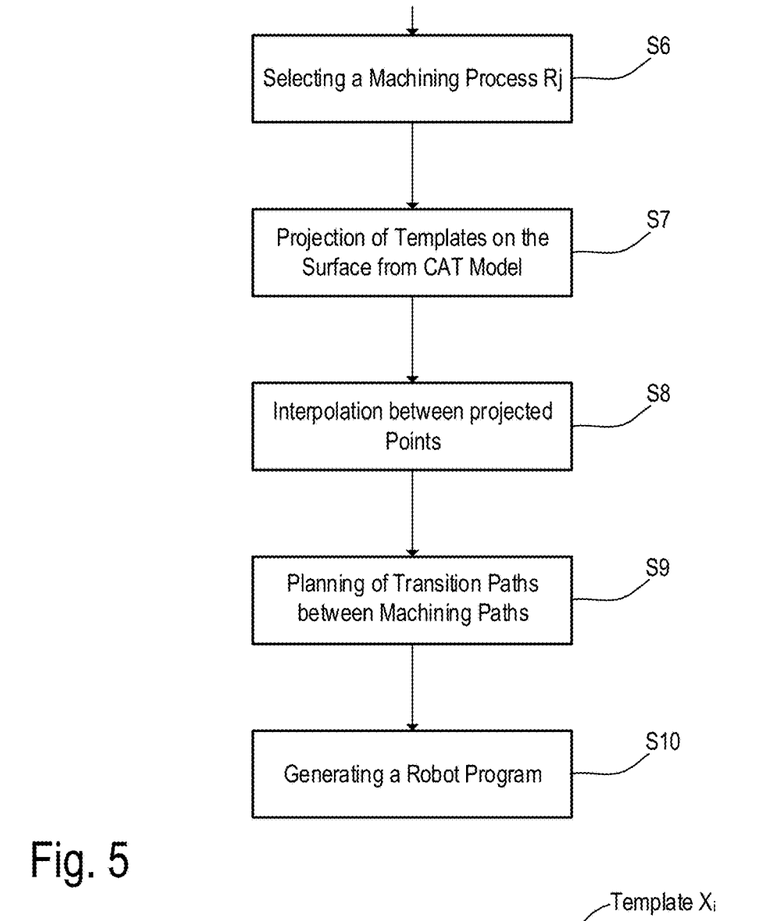
FIG. 5 illustrates, in a flow chart, the determination of machining paths in accordance with FIG. 4 as well as the subsequent generation of a robot program.

The flow chart of FIG. 5 shows one example of the generation of a robot program for the machining of surface defects starting at the selection of a machining process $R_j$ dependent on the defect category $K_j$ (see FIG. 5, step S6). A machining process $R_j$ may include one or more machining steps each with one or more respective machining path templates $X_i$. Each of the templates $X_i$ is composed of a set of points (at least two points) $X_{i1}$, $X_{i2}$, etc. To calculate the actual machining path $X_i$ the points of the template are projected (see FIG. 5, step S7) from the defect plane $E_i$ onto the workpiece surface (in accordance with the CAD model). The projected points $X_{i1}'$, $X_{i2}'$, etc. and interjacent points, e.g. intermediate points determined by interpolation, render the desired machining path (see FIG. 5, step S8). The transition paths between two machining paths (within one or more machining steps of a process $R_j$ or between the last path of a process for machining the defect $D_i$ and the first path for machining the next defect $D_{i+1}$) may be calculated using well-known automated path planning methods (see FIG. 5, step S9). From the thus planned machining and transition paths one or more robot programs may be automatedly generated with computer assistance using well-known techniques (see FIG. 5, step S10). The method steps illustrated by in FIG. 5 may be performed at least partly by the data processing device 50 shown in FIG. 1. In particular, the data processing device 50 may be configured to perform the mentioned projection of the templates, the mentioned interpolation, the automated path planning to obtain the transition paths, as well as the automated robot program generation.

Figure 4:
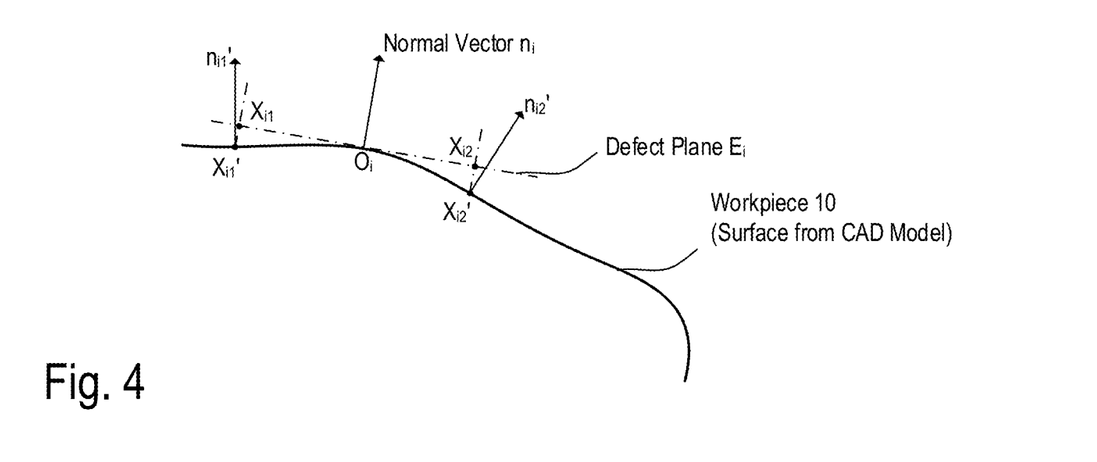
FIG. 4 illustrates the determination of machining paths for machining a defect by projecting a template onto the workpiece surface.
Figure 6:
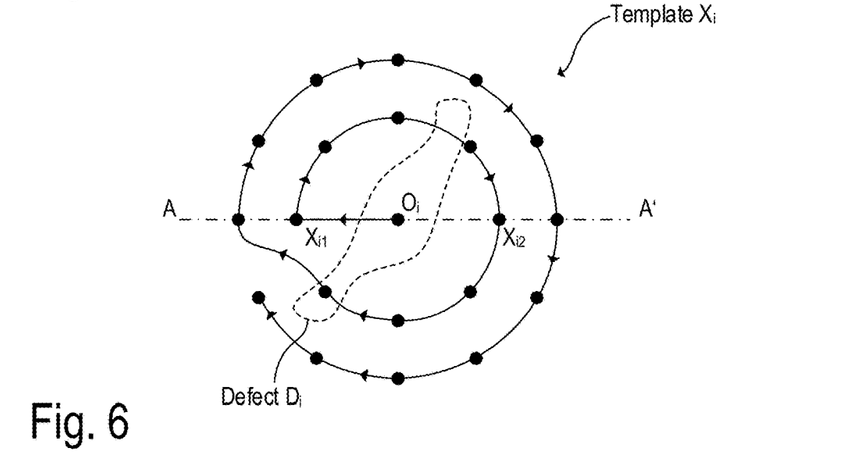
FIG. 6 illustrates an example of a machining paths template.
Figure 7:
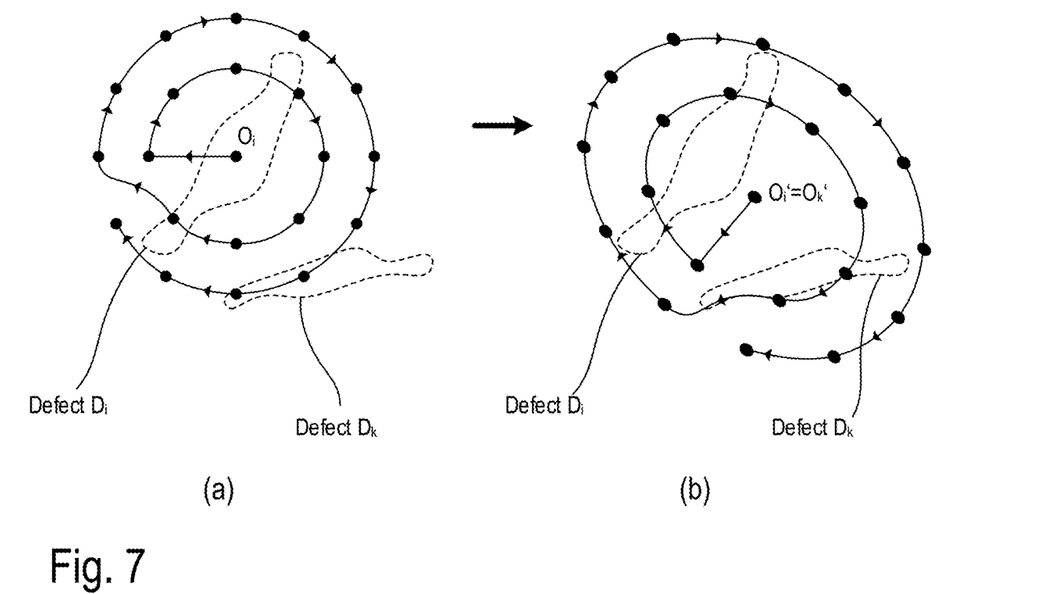
FIG. 7 illustrates the adaption of a template, by rotating, scaling, shifting and/or skewing, for the machining of two neighboring surface defects of the same category in one process.
Figure 8:
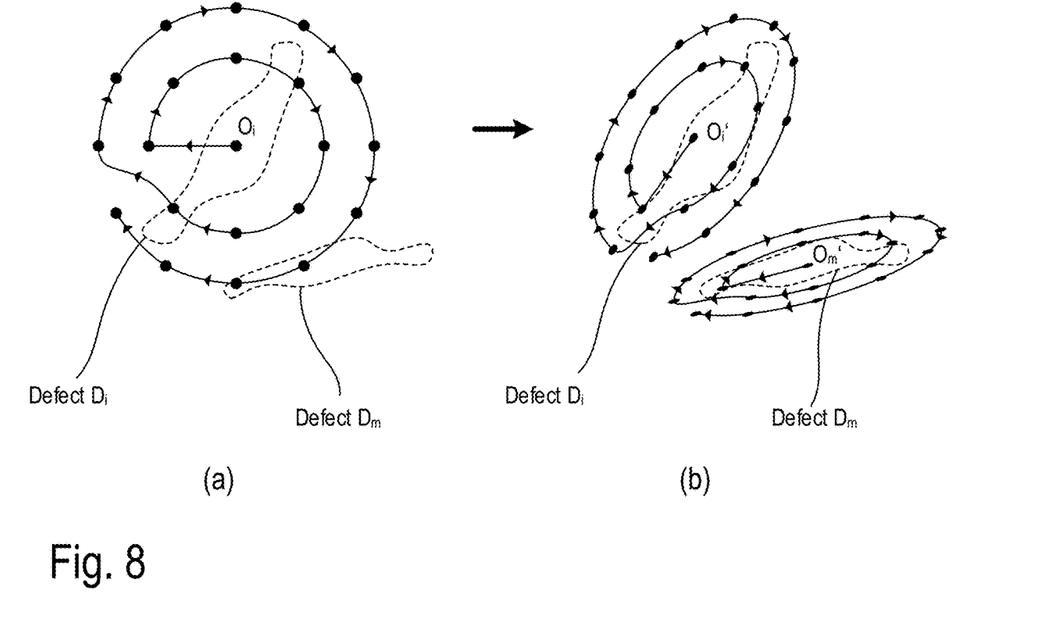
FIG. 8 illustrates the adaption of two templates, by rotating, shifting and/or skewing, for the non-overlapping machining of two neighboring surface defects of different categories.

FIG. 6 schematically shows a template $X_i$ for the determination of a machining path $X_i'$ (cf. projection in accordance with FIG. 4) of a machining process $R_j$ for the machining of a defect $D_i$ of category $K_j$ (the line A-A' represents the sectional plane illustrated in FIG. 4). The template may be adapted to the defect $D_i$ dependent on its lateral extension, e.g. by means of transformation by shifting, rotating, scaling or skewing or an arbitrary combination of shifting, rotating, scaling and skewing. A problem may occur when two defects $D_i$, $D_k$ lie so closely side by side that the machining paths of the processes for the machining of the two defects $D_i$, $D_k$ intersect. The machining area of a machining process $R_j$ is that area of the workpiece surface which is actually machined by the tool during the machining process $R_j$. When the machining paths belonging to different machining processes $R_j$ $R_k$, lie too closely side by side such an overlap may occur. Whether an overlap (i.e. a collision of two machining processes) will occur can be determined during the projection (FIG. 5, step S8). In the event of an overlap, two options exist: in the event of two neighboring defects $D_i$, $D_k$ of the same category $K_j$, it may be checked (with the use of software), whether both defects $D_i$, $D_k$ can be repaired simultaneously in one process by applying a transformation (shift, rotation, scaling, and/or skew) to the template (see FIG. 7); in the event of two neighboring defects $D_i$, $D_k$ of different categories, it may be checked (with the use of software), whether an overlap can be avoided when applying a transformation to the respective templates (see FIG. 8).

Figure 9:
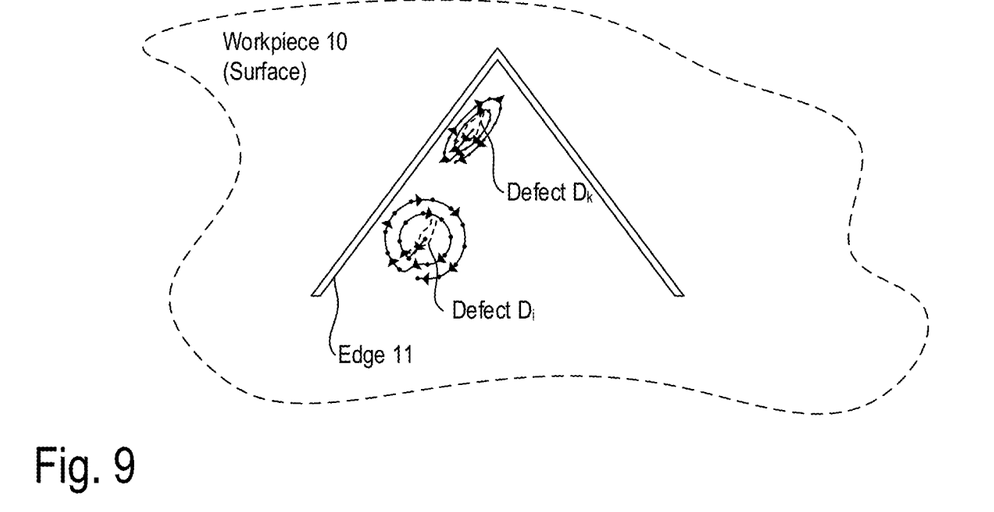
FIG. 9 illustrates adaption of a template, by rotating, scaling, shifting and/or skewing, for the machining to avoid overlaps with an edge.

Dependent on the geometry of the workpiece, certain areas of the workpiece surface may not be able to be machined (e.g. design edges and the like). Such "forbidden areas" of the workpiece surface may be marked in the CAD model, for example, as a set of edges (depicted as spread lines), which must not overlap with a machining area (see FIG. 9, edge 11). Whether this is the case (i.e. an overlap exists) may be checked during the projection of the template onto the surface of the CAD model (FIG. 5, step S8). Also in this case, an attempt may be made to avoid an overlap by use of a transformation (shift, rotation, scaling, skew) of the respective template. This situation is illustrated in FIG. 9. The defect $D_i$ is far enough away from the edge 11 so that a transformation of the template is not necessary. To calculate the machining path of the process for machining the defect $D_k$, the machining path has been shifted and skewed in the present example to avoid an overlap with edge 11. The approach is substantially the same as before in the example of FIG. 8.

Figure 10:
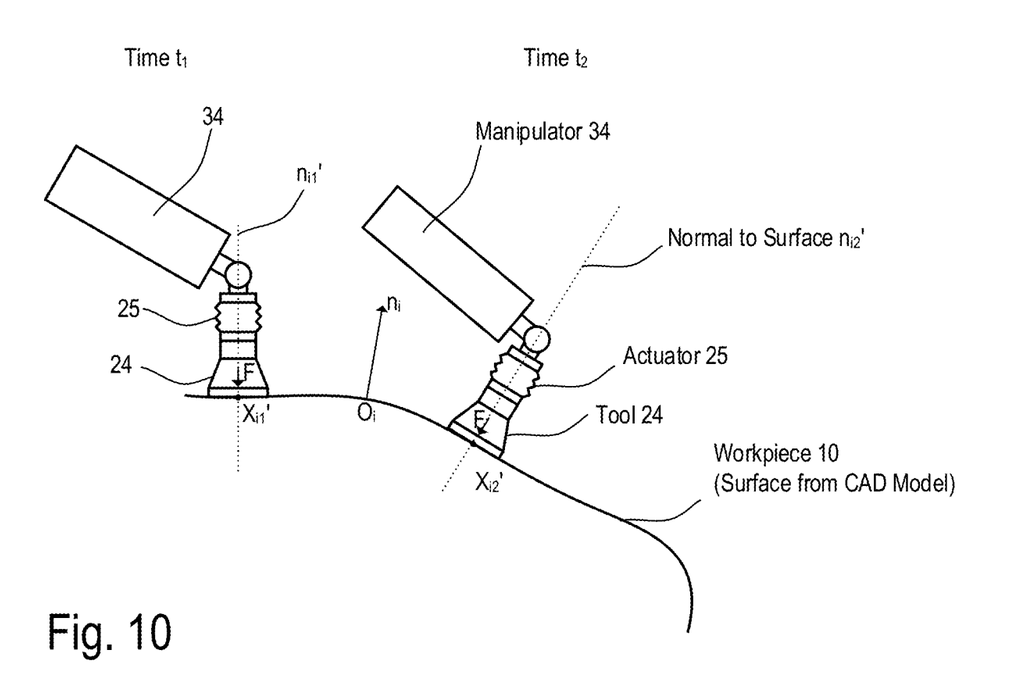
FIG. 10 exemplarily shows the machining process for machining a surface defect.

FIG. 10 exemplarily shows a portion of a machining process for machining a surface defect $D_i$. The surface geometry corresponds to the illustration of FIG. 6. One can see the points $X_{i1}$ and $X_{i2}$ of the machining path projected onto the surface and the respective position of the tool 24 (at point $X_{i1}$ at time $t_1$ and at point $X_{i2}$ at time $t_2$). The tool is aligned by the manipulator 24 such that the force F, which is exerted by tool 24 onto the surface of workpiece 10, is always effective normal to the direction of the respective surface ($n_{i1}'$ or $n_{i2}'$). An actuator 25, acting between tool 24 and TCP of the manipulator 34, allows for an arbitrary regulation of the force F in accordance with specifications which are stored in the mentioned database for a specific machining process.

Figure 11:
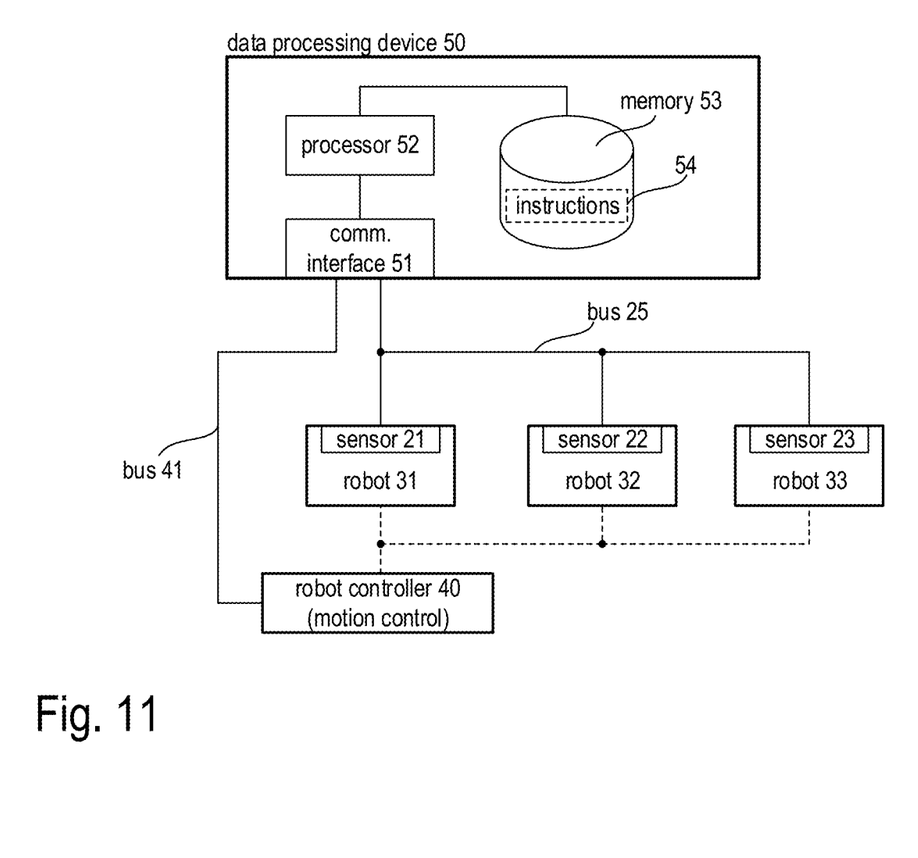
FIG. 11 illustrates one example structure of a system for the automated detection of defects in a workpiece surface and for the generation of a robot program for the machining of the workpiece.

FIG. 11 is a block diagram illustrating one example structure of a system for the automated detection of defects in a workpiece surface and generation of a robot program for the machining of the workpiece. FIG. 11 partly corresponds to the system of FIG. 1. However, emphasis is placed on the interaction between the components and the data processing device 50. As already mentioned above, the optical inspection system is, as such, known and commercially available, e.g. the system reflectCONTROL of Micro-Epsilon Messtechnik. As in FIG. 1, the robots 31, 32, 33 carry the sensors 21, 22, and 23, which were already explained in detail above and, therefore, reference is made to these explanations. As mentioned, the data processing device 50 may be an entity including hardware, software or any combination thereof which is suitable to perform and/or control the methods described herein, in particular with reference to FIGS. 3 and 5. The data processing device 50 may be a workstation computer or a personal computer. As such, the data processing device 50 may include one or more processors 52 as well as a memory 53 configured to store data including processor instructions 54 and other data (e.g. the measured point clouds obtained from the sensors 21, 22, 23, data derived therefrom and related data).

The data processing device can communicate with the sensors 21, 22, and 32 as well as with the robots 31, 32, and 33 (e.g. via the robot controller 40). For this purpose the processing device 50 may include one or more communication interfaces 51, which allow data transmission to and from the sensors 21, 22, and 32, e.g. via a communication bus 25, and to and from the robot controller 40, e.g. via communication bus 41. The term "communication bus" includes any known hardware and a respective communication protocol that allows the data processing device to communicate with the sensors and the robot controller 40. For example, the communication busses may be implemented as field busses or serial busses, such as Universal Seral Bus, or packed based communication busses such as Ethernet or the like. Alternatively, wireless communication may be used instead of wired connections. Although the present example shows different busses for the communication with the sensors and the robot controller, a single bus system (e.g. a network) may be used instead.

The invention claimed is:

1. A method for automated detection and robot-assisted machining of a defect in a workpiece surface, the method comprising:

optically inspecting, using an optical inspection system, the workpiece surface of a workpiece to detect a defect;

measuring, in three dimensions and using optical sensors of the optical inspection system, the workpiece surface in an area of the detected defect;

determining a topography of the workpiece surface in the area of the defect;

determining a parameter set that characterizes a determined topography of the defect;

categorizing the defect based on the determined parameter set, wherein the defect is assigned to a defect category;

selecting a machining process dependent on the defect category of the defect, wherein each machining process is associated with a template of a machining path along which the defect is to be machined;

determining a machining path for the defect, wherein determining the machining path includes projecting the template onto the workpiece surface in accordance with a CAD model of the workpiece;

generating, via a computing device, a robot program for robot-assisted machining of the defect.

2. The method in accordance with claim 1, wherein optically inspecting comprises:
   imaging of a portion of the workpiece surface to obtain a digital image of the workpiece surface; and
   detecting the defect with the use of image processing methods.

3. The method in accordance with claim 1, measuring the workpiece surface comprises:
   determining a point cloud with points on the workpiece surface in the area of the detected defect with use of an optical measurement technique.

4. The method in accordance with claim 3, wherein determining the topography of the workpiece surface comprises:
   performing a surface reconstruction for a three-dimensional reconstruction of the workpiece surface in the area the defect.

5. The method in accordance with claim 1,
   wherein the parameter set includes, as a parameter, values selected from the group consisting of: spatial extension of the defect along the workpiece surface in spatial direction; spatial extension of the defect perpendicular to the workpiece surface; area of the defect; ratio between the area of the defect and the spatial extension of the defect perpendicular to the workpiece surface; direction of the spatial extension of the defect perpendicular to the workpiece surface; and a combination thereof.

6. The method in accordance with claim 1,
   wherein the machining process is selected from a plurality of machining processes which are stored in a database, wherein each possible defect category is associated with exactly one machining process.

7. The method in accordance with claim 1,
   wherein the template of a machining path is defined by a set of points in a defect plane, and each point of the set of points are projected onto the workpiece surface in accordance with a CAD model of the workpiece to obtain a corresponding set of projected points, which define the machining path for the respective defect,
   wherein the defect plane is tangent to the workpiece surface in a central point of the respective defect.

8. The method in accordance with claim 1, further comprising:
   checking, in a process of determining the machining path, whether the workpiece surface area to be machined resulting from this machining path leads to an overlap with an additional surface area to be machined or to an overlap with spread lines defined in a CAD model of the workpiece.

9. The method in accordance with claim 8,
   wherein an overlap is avoided by transforming the template of the machining path, and
   wherein transforming the template of the machining path includes a transformation of scaling, shifting, rotating, skewing or a combination thereof.

10. The method in accordance with claim 8, further comprising:
    if an overlap with surface area to be machined of an additional defect is detected:
       checking whether the defect and the additional defect can be machined together by transforming the template of the machining path, and
    wherein the transformation includes a transformation of scaling, shifting, rotating, skewing or a combination thereof.

11. A system for automated detection and robot-assisted machining of a defect in a workpiece surface, the system comprising:
    an optical inspection and measurement system for inspecting the workpiece surface to detect a defect and for a three-dimensional measurement of the workpiece surface in the area of the detected defect with the use of optical sensors;
    a robot for machining the workpiece surface; and
    a data processing device configured to:
       determine the topography of the workpiece surface in the area of the defect;
       determine a parameter set that characterizes the defect;
       categorize the defect based on the determined parameter set, wherein the defect is assigned to a defect category;
       select a machining process stored in a database in dependency of the defect category of the defect, wherein each machining process is associated with a template of a machining path along which the defect is to be machined;
       determine a machining path for the defect by projection of the template onto the workpiece surface in accordance with a CAD model of the workpiece; and
       generate a robot program for the robot-assisted machining of the defect by the robot.

12. A method for automated detection of a defect in a workpiece surface and generation of a robot program for the machining of the workpiece, the method comprising:
    localizing a defect in a surface of a workpiece;
    determining a three-dimensional topography of the localized defect;
    categorizing the localized defect based on the determining a three-dimensional topography;
    selecting a machining process dependent on a defect category of the defect;
    generating, via a computing device, a robot program for robot-assisted machining of the defect in accordance with a selected machining process.

13. The method in accordance with claim 12, wherein each machining process is associated with a template of a machining path along which the defect is to be machined.

14. The method in accordance with claim 13, further comprising:
    determining a machining path for the defect by use of a projection of the template onto the workpiece surface in accordance with a CAD model of the workpiece.

15. The method in accordance with claim 12, further comprising:
    determining a parameter set which characterizes the three-dimensional topography of the localized defects,
    wherein categorizing the localized defect is carried out based on the determined parameter set, wherein the defect is associated with a defect category.

16. The method in accordance with claim 12, wherein determining the three-dimensional topography of the localized defects includes determining three-dimensional coordinates of a point cloud and a three-dimensional reconstruction of the workpiece surface in the area of a respective defect.

17. A system for automated detection of a defect in a workpiece surface and generation of a robot program for the machining of the workpiece, the system comprising:
    an optical inspection system for localization of a defect in a surface of a workpiece;
    a data processing computer configured to:
       determine a three-dimensional topography of a localized defect;

assign a localized defect to a defect category based on its the determined three-dimensional topography;

select a machining process dependent on a defect category of the defect;

generate a robot program for the robot-assisted machining of the defect in accordance with a selected machining process.

* * * * *